United States Patent Office 3,169,147
Patented Feb. 9, 1965

3,169,147
1,2-DIMETHYLCYCLOBUTENEDIONE AND
METHOD OF PREPARATION
Alfred T. Blomquist and Richard A. Vierling, both of
Ithaca, N.Y., assignors to The B. F. Goodrich Company,
New York, N.Y., a corporation of New York
No Drawing. Filed Oct. 24, 1961, Ser. No. 147,173
4 Claims. (Cl. 260—586)

This invention relates to a new and useful cyclic diketone and to a method for its preparation and more particularly refers to 1,2-dimethylcyclobutenedione and to the method of its preparation by hydrolysis of 1,2-dimethyltetrafluorocyclobutene with strong sulfuric acid or polyphosphoric acid at a temperature of from about 50° C. to about the reflux temperature of the mixture.

The compound of this invention has the structure

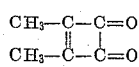

It is useful as a chemical reagent for characterizing hydrazines and can be employed as a raw material for preparing dimethylmaleic anhydride.

The 1,2-dimethyltetrafluorocyclobutene, which is hydrolyzed to 1,2-dimethylcyclobutenedione can be prepared by methylating perfluoro cyclobutene with methyl lithium by a modification of the procedure described by S. Dixon, J. Org. Chem. 21, 400 (1956).

To a dry, nitrogen swept 5-liter, 3-necked flask fitted with a stirrer and two Dry Ice condensers, were added 3000 ml. of dry diethyl ether and 65 g. of lithium wire which had been cut into pieces of about ½ inch length. The mixture was cooled to about 0° C. in a Dry Ice-acetone bath and then methyl bromide was condensed into the stirred mixture until the lithium completely disappeared. The bath was subsequently cooled to —45° C. and 324 g. of perfluorocyclobutene were slowly distilled into the stirred mixture over a two to three hour period. The mixture was then stirred for an additional two hours at —45° C. and then allowed to warm slowly for three hours before removing from the bath.

Excess methyl lithium was decomposed with 200 ml. of a 1:1 aqueous HCl solution. The ether solution was decanted from the heavy white precipitate which formed. The ethereal solution was washed with 100 ml. of water, several 100-ml. portions of saturated sodium carbonate solution and a final 100-ml. portion of water. The ether solution was then dried over magnesium sulfate, filtered and the ether was distilled. The crude

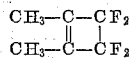

was collected as a distillate, B.P. 95–104° C. This was vigorously stirred with 200 ml. of water to remove the last traces of HF. The organic layer was again dried over magnesium sulfate and then fractionally distilled at 100–104° C. The final product had an $n_D^{27.5}$ of 1.3478.

When the methylation was carried out at temperatures below —45° C. the reaction was sluggish, as evidenced by the large amount of unreacted perfluorocyclobutene. If the reaction was carried out at —40° C. it was too vigorous to be controlled and resulted in a considerable amount of tar formation.

The examples which follow are intended to illustrate the invention, not to limit its scope. In all instances parts are given by weight unless otherwise specified.

*Example I*

A mixture of 20 g. of 1,2-dimethyl-3,3,4,4-tetrafluorocyclobutene and 100 ml. of 96% sulfuric acid was stirred vigorously and heated to 65–70° C. for one hour in a 200-ml., 3-necked flask equipped with a stirrer and a condenser. Hydrogen fluoride evolution was apparent within a few minutes at this temperature and the evolution was complete before the expiration of the holding time. The mixture was then poured onto 600 g. of crushed ice and 110 g. of a 30% aqueous solution of NaOH were added. The mixture was extracted with five 100-ml. portions of ether, and after salting out the aqueous mixture, the latter was extracted with five additional 100-ml. portions of ether. The combined ether extracts were dried over magnesium sulfate and concentrated in vacuo to yield a dark red oil. Fractional distillation of the oil yielded 6.29 g. of a yellow green liquid, which on further purification had a B.P. of 76° C. at 2 mm. and an $n_D^{24}$ of 1.4893.

On analysis the following results were obtained.
Found: C, 65.41; H, 5.49; mol. wt., 127 (Rast). Calculated for $C_6H_6O_2$: C, 65.44; H, 5.49; mol. wt., 110.

The 1,2-dimethylcyclobutenedione solidified at about 25° C., so that condensation temperature must be controlled to avoid solidification in the condenser.

The pure diketone is quite stable. It can be stored at room temperature for several weeks without any notiticeable change in the absence of direction sunlight. It is soluble in water, ether, chloroform, benzene, dioxane, acetonitrile and mineral acids.

The compound of this invention showed infrared absorption bands at 5.60 and 5.67 microns (unresolved doublet) with a shoulder at 5.49 microns, weak absorption at 2.83 microns, and strong sharp absorption at 6.21 microns.

The n.m.r. proton spectrum shows only one unresolved peak at 2.40 p.p.m. to lower field than the resonance of protons in an internal tetramethyl silane standard.

The n.m.r. spectrum of biacetyl showed a single unresolved peak in the same region.

In ethanol solution the ultraviolet absorption of

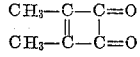

had the following maxima (epsilons in parentheses) 216 (18,800), 340 (26) with a shoulder at 355 (23) millimicrons.

When the ethanol stock solution of the compound stood for 9 days the intensity at the maximum 216 millimicrons decreased to 13,500 and after 16 days to 12,080 epsilons. This indicates a slow deterioration of the diketone.

*Example II*

Polyphosphoric acid was prepared by adding 140 g. of $P_2O_5$ in 20-g. portions to 95 ml. of 85% orthophosphoric acid, followed by heating on a steam bath for three to four hours.

To a 500-ml. flask equipped with a stirrer, condenser and thermometer, were added 300 grams of polyphosphoric acid and preheated to 100–105° C. Then 20 g. of

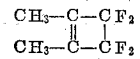

were added and the mixture was stirred vigorously at 100–105° C. the reflux temperature of the mixture, for 1.5 hours. The reaction mixture was poured onto 300 g. of crushed ice, and, while cold, 110 g. of 30% aqueous sodium hydroxide were added. The subsequent work-up and purification procedure was the same as that described in Example 1. A yield of 43% of

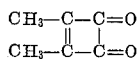

was obtained. The properties of the 1,2-dimethylcyclobutenedione were the same as those obtained in Example 1.

Substitution of 100% H₃PO₄, made by dissolving 95 g. of P₂O₅ in 248 g. of 85% orthophosphoric acid, for the polyphosphoric acid and then running the reaction under substantially the same conditions as described in Example 2 results in the production of only about 15% of a very impure diketone which tends to decompose within a very few hours after distillation, as evidenced by the development of a deep green color.

When sulfuric acid is employed as the hydrolytic agent it should contain from 90 to 98% H₂SO₄, but it is preferred to use 96 to 97% acid. The polyphosphoric acid should analyze about 77% or more P₂O₅ and can be as high as 95% P₂O₅. Ordinary technical grade, concentrated sulfuric acid is usually satisfactory. For best results the quantity of either sulfuric or polyphosphoric acid employed in the reaction should be sufficient to dissolve the dimethylperfluorocyclobutene fairly rapidly at the reaction temperature. This will require about 4 ml. of either sulfuric or polyphosphoric acid per gram of the dimethylperfluorocyclobutene. The reaction proceeds most rapidly and smoothly when the perfluorocyclobutene is dissolved in the hydrolyzing medium, and undesirable by-products are reduced to a minimum. However, smaller amounts of hydrolyzing medium can be used at a sacrifice of yield of the desired diketone. There is no maximum amount of hydrolyzing medium that can be used. The sole limiting factor is the practicality of the work-up procedures employed when large quantities of acid are used.

The temperature at which the reaction can be run varies somewhat depending on the strength of acid used. With sulfuric acid of 90–92% strength the temperature can be as low as about 50° C. and as high as about 100° C. with an increase in concentration of the sulfuric acid up to 98%, the maximum temperature should not exceed about 80–85° C. to avoid undue amounts of by-products.

The most desirable reaction temperatures for obtaining best yields of the diketone are also dependent on the P₂O₅ content of the polyphosphoric acid. Thus, if the P₂O₅ content of the polyphosphoric acid is about 90%, the lower range of temperature is best (50–75° C.), but with a P₂O₅ content in the 77 to 80% range the temperature can go as high as the reflux temperature, which may vary between about 105 to about 120° C.

The reaction, of course, can be carried out under induced pressure or at sub-atmospheric pressure.

The compound of this invention is useful for preparing dimethylmaleic anhydride, which can be employed for making polyesters or for copolymerizing with other mono- or diunsaturated monomers by addition polymerizations, using procedures known in the art. It is also useful for characterizing hydrazines, because through controlled conditions either the mono- or dihydrazones can be prepared.

To a solution of 1.61 g. of

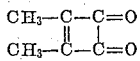

in 15 ml. water were added 25 g. of a 30–35% hydrogen peroxide solution. Within 5 minutes a mild exothermic reaction occurred, and dimethylmaleic anhydride began to crystallize. After 1.5 hours the mixture was filtered and the white solid was washed with water. A 71% yield of dimethylmaleic anhydride having an M.P. of 93–94° C. after sublimation at 35° C. and 0.15 mm. was obtained. A mixed melting point with authentic dimethylmaleic anhydride was 93.5–95° C.

A mono-2,4-dinitrophenylhydrazone derivative was prepared by the dropwise addition of one equivalent of 2,4-dinitrophenylhydrazine over a 2.5-hour period to an ethanol solution of one equivalent of

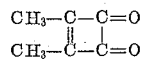

The derivative was obtained in the form of hard, red-orange plates. It had a melting point of 205–208° C. (with decomposition) after several recrystallizations from ethyl acetate.

*Analysis.*—Calculated: C, 49.65; H, 3.47; N, 19.30. Found: C, 49.68; H, 3.49; N, 19.45.

A ditosylhydrazone was prepared by evaporating a methanol solution containing equimolar quantities of the diketone and P-toluenesulfonylhydrazine on a hot plate until crystals first appeared. On cooling the mixture, the derivative was obtained in the form of white needle-like crystals. After several recrystallizations from 95% ethanol the crystals had a melting point of 190–191° C. with decomposition.

*Analysis.*—Calculated: C, 53.70; H, 4.97; N, 12.55. Found: C, 53.71; H, 5.02; N, 12.60.

We claim:

1. A method for preparing 1,2-dimethylcyclobutenedione comprising blending $$CH_3-C-CF_2$$
$$\parallel \quad \mid$$
$$CH_3-C-CF_2$$

with an excess of polyphosphoric acid having a P₂O₅ content from about 77 to about 95% by weight, heating to a temperature of about 50° C. to about reflux temperature of the mixture and recovering

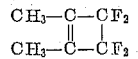

2. The method of claim 1 in which the polyphosphoric acid is made by mixing 140 g. of P₂O₅ with 90 ml. of 85% H₃PO₄ and heating to 90–100° C. for 2 to 3 hours.

3. The method of claim 1 in which the reaction temperature is 90–105° C.

4.

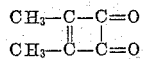

References Cited by the Examiner

UNITED STATES PATENTS 2,650,939   9/53   McBee et al. _____ 260—586

OTHER REFERENCES

Blomquist et al.: American Chemical Society Abstracts of papers, 135th Meeting, 1959, pp. 54–0.

LEON ZITVER, *Primary Examiner.*

CHARLES B. PARKER, *Examiner.*